US012624568B2

(12) United States Patent
Raykhenberg

(10) Patent No.: US 12,624,568 B2
(45) Date of Patent: May 12, 2026

(54) FLEXIBLE DOOR LATCH PLATE

(71) Applicant: Mark Raykhenberg, Glendora, CA (US)

(72) Inventor: Mark Raykhenberg, Glendora, CA (US)

( * ) Notice: Subject to any disclaimer, the term of this patent is extended or adjusted under 35 U.S.C. 154(b) by 40 days.

(21) Appl. No.: 18/752,833

(22) Filed: Jun. 25, 2024

(65) Prior Publication Data

US 2025/0389137 A1 Dec. 25, 2025

(51) Int. Cl.
*E05B 15/02* (2006.01)

(52) U.S. Cl.
CPC ...... *E05B 15/022* (2013.01); *E05B 2015/023* (2013.01)

(58) Field of Classification Search
CPC .. E05B 15/022; E05B 15/023; E05B 15/0006; E05B 15/02; E05B 15/0205; E05B 15/0225; E05B 15/0255; E05B 15/16; E05B 15/1635; E05B 2015/1671; Y10T 292/688; Y10T 292/68; Y10T 292/696
See application file for complete search history.

(56) References Cited

U.S. PATENT DOCUMENTS

D34,243 S * 3/1901 Taylor .......... D8/344
1,563,667 A * 12/1925 Smith .......... E05B 15/025 292/341.18
1,822,424 A * 9/1931 Scott .......... E05B 17/2003 292/346
2,042,024 A * 5/1936 Schlage .......... E05B 15/0205 292/341.18
2,208,610 A * 7/1940 Swallow .......... E05B 15/022 292/341.15
2,535,444 A * 12/1950 Miller .......... E05B 15/0255 292/341.13
2,604,347 A * 7/1952 Snyder .......... E05B 15/0205 292/340
2,645,516 A * 7/1953 Robertson .......... E05B 15/0205 292/341.12
2,692,158 A * 10/1954 Tirschel .......... E05B 17/2003 292/346
3,257,139 A * 6/1966 Russell .......... E05B 15/0245 292/341.18
3,316,007 A * 4/1967 Russell .......... E05B 15/0255 292/341.12
3,825,289 A * 7/1974 Armstrong .......... E05B 15/0205 292/DIG. 60
4,017,106 A * 4/1977 Salazar .......... E05B 17/2003 70/416
(Continued)

FOREIGN PATENT DOCUMENTS

DE 19906577 A1 * 8/2000 .......... E05C 9/1808
DE 202008005087 U1 * 7/2008 .......... E05B 15/0205
(Continued)

*Primary Examiner* — Steven A Tullia
(74) *Attorney, Agent, or Firm* — Mark Raykhenberg

(57) ABSTRACT

A flexible door latch strike plate for reducing noise of a closing door includes a rectangular body having rounded corners and a rectangular center opening, one or more flaps around the center opening intended to deform around a door latching bolt assembly, one or more protrusions on the back of the body intended to prevent the door and door jamb from directly colliding and two screw hole openings to fasten to a door jamb.

9 Claims, 10 Drawing Sheets

(56) References Cited

U.S. PATENT DOCUMENTS

| | | | | | |
|---|---|---|---|---|---|
| 4,021,880 | A * | 5/1977 | Murphy | E05F 5/02 | 292/340 |
| 4,181,338 | A * | 1/1980 | Sterling | E05B 15/022 | 292/341.17 |
| 4,183,568 | A * | 1/1980 | Ferracane | E05B 17/2003 | 292/346 |
| 4,629,231 | A * | 12/1986 | Bouchard | E05B 17/2003 | D8/344 |
| 4,717,185 | A * | 1/1988 | Hartley | E05B 15/0205 | 292/346 |
| 4,893,854 | A * | 1/1990 | Dietrich | E05B 15/022 | 292/341.12 |
| 5,094,489 | A * | 3/1992 | Jones | E05B 15/0205 | 292/DIG. 60 |
| D351,781 | S * | 10/1994 | DeWitt | D8/343 | |
| 6,834,897 | B1 * | 12/2004 | Walker | E05B 15/0205 | 292/340 |
| 9,822,550 | B2 * | 11/2017 | Fenwick | E05B 15/022 | |
| 9,932,755 | B2 * | 4/2018 | Niccole | E05B 15/0205 | |
| 11,859,406 | B2 * | 1/2024 | Kirk | E05B 15/0205 | |

FOREIGN PATENT DOCUMENTS

| | | | | |
|---|---|---|---|---|
| DE | 202010008334 U1 * | 10/2010 | E05B 15/0205 |
| DE | 102009019731 A1 * | 12/2011 | E05B 15/0205 |
| DE | 102014106972 A1 * | 11/2014 | E05B 15/0205 |
| DE | 102014011196 A1 * | 1/2016 | E05B 15/0205 |
| DE | 202017107662 U1 * | 1/2018 | E05B 5/006 |
| EP | 1113127 A1 * | 7/2001 | E05B 15/022 |
| EP | 1703043 A2 * | 9/2006 | E05B 15/0205 |
| EP | 4008861 A1 * | 6/2022 | E05B 15/0225 |
| GB | 2348239 A * | 9/2000 | E05B 15/0225 |
| GB | 2450927 A * | 1/2009 | E05B 15/0255 |
| GB | 2463991 A * | 4/2010 | E05B 15/0205 |
| JP | 5154356 B2 * | 2/2013 | E05B 15/02 |
| KR | 102509888 B1 * | 3/2023 | E05B 15/022 |
| NL | 8104522 A * | 2/1983 | E05B 15/0205 |
| NL | 9000567 A * | 10/1991 | E05B 15/0205 |
| NL | 1038588 C2 * | 8/2012 | E05B 15/0255 |
| WO | WO-2009131375 A2 * | 10/2009 | E05B 15/022 |

* cited by examiner

FLEXIBLE DOOR LATCH PLATE

CROSS-REFERENCE TO RELATED DOCUMENTS

The present application claims priority to provisional patent application No. 63/525,655, filed on Jul. 8, 2023 disclosures of which are incorporated herein at least by reference.

BACKGROUND OF THE INVENTION

Field of the Invention

The present invention relates to the field of door latches.

Description of the State of the Art

The existing door latch strike plate is designed to impact with a latch bolt in the door and compress the latch bolt until it can clear the center opening, the latch bolt is then released and trapped in the opening to hold the door latched.

This existing design accomplishes the task of ramping the latch bolt up and holding it in place but does not address the added noise from metal-on-metal contact and the release of pent up energy when the latch bolt is released into the center opening. Furthermore, the door and door jamb make contact to add to the noise and the act of metal-on-metal rubbing and hitting amplifies and reverberates the noise out of the center opening.

Therefore, what is clearly needed is a strike plate specifically designed and made with materials to dampen noise and wear and tear when in use.

BRIEF SUMMARY OF THE INVENTION

In one embodiment of the invention a flexible door latch strike plate for reducing noise of a closing door is provided, comprising a rectangular body having rounded corners, a rectangular center opening, one or more flaps around the center opening intended to deform around a door latching bolt assembly, one or more protrusions on the back of the body intended to prevent the door and door jamb from directly colliding, two screw hole openings to fasten to a door jamb. Also in one embodiment the body is partially or completely molded from a flexible material.

In another aspect of the invention a method is provided comprising the steps (a) flexible ramp deforming when making initial contact with the door latch bolt assembly reducing the noise of latch bolt to strike plate contact, (b) flexible flaps affixed to the center opening generating friction with the latch bolt, slowing down its descent into the latch bolt opening of a door jamb and absorbing pent up spring loaded energy, (c) flexible perpendicular protrusion preventing and absorbing impact of door on door jamb and eliminating potentially emitted noise.

DETAILED DESCRIPTION OF THE INVENTION

The inventor provides a door strike plate adapted in a preferred embodiment to reduce the noise of a closing door and that incorporates a flexible material to absorb and lessen noise. The present invention is described in enabling detail using following examples, which may describe more than one relevant embodiment falling within the scope of the present invention.

Figure 1:
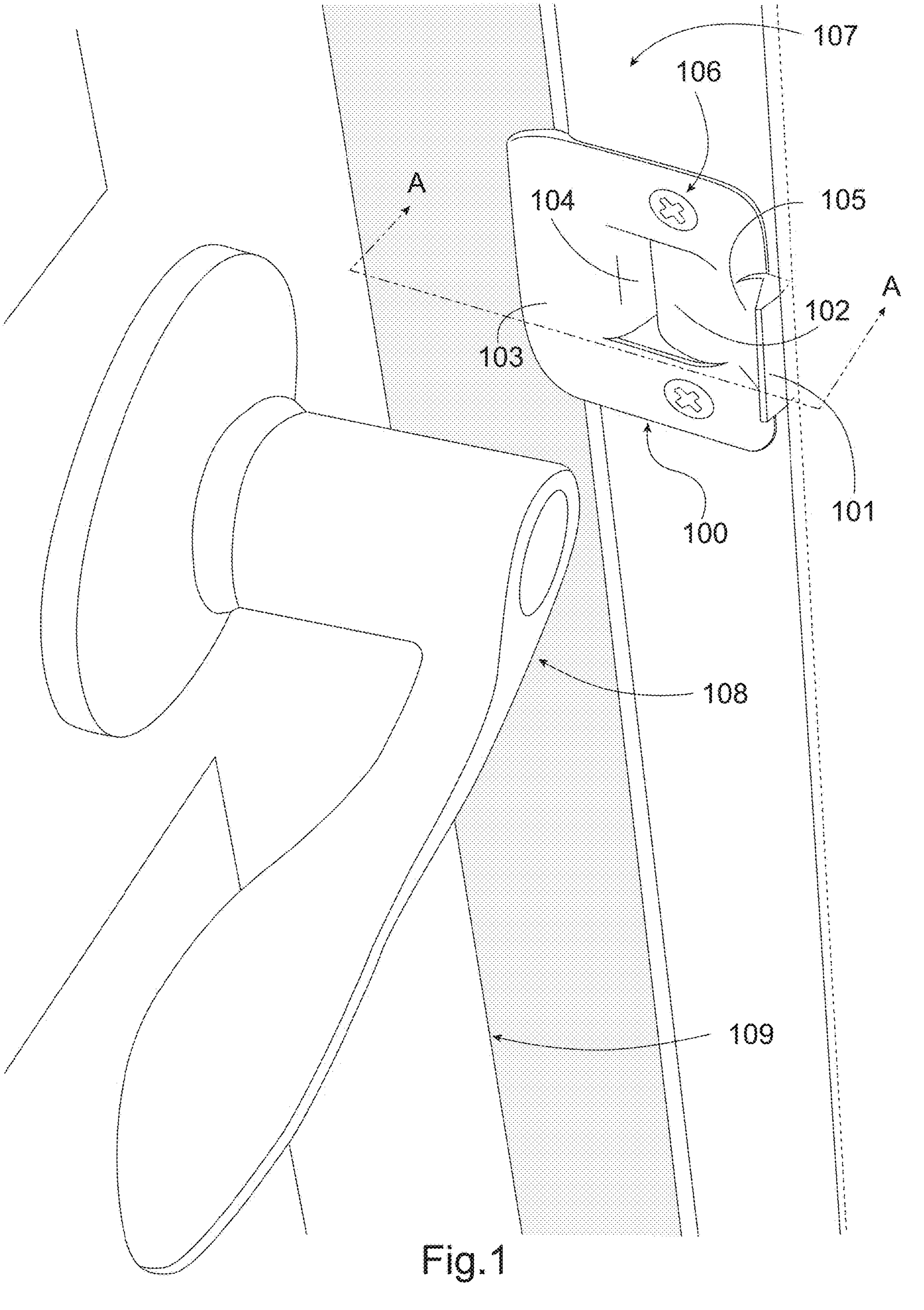
FIG. 1 is a perspective view of a strike plate, according to one embodiment of the present invention.

FIG. 1 is a perspective view of a strike plate 100 in this example installed in a door jamb 107 showing a door 109 and a door latch mechanism 108 with which it interacts according to one embodiment of the present invention. Strike plate 100 is rectangular in shape and made of a flexible material, in this example. The strike plate 100 is compressed of elements that work together to dampen the noise including an impact ramp 103, guide ramp 104, catch flap 102, ramp 105 and slam barrier 101. Flexible material such as thermoplastic elastomers (TPE), silicone, polyurethane (PU), polyethylene (PE), polypropylene (PP), nylon (polyamide), ethylene propylene diene monomer (EPDM) rubber, thermoplastic polyurethane (TPU), polytetrafluoroethylene (PTFE), Kevlar, and flexible polyvinyl chloride (PVC) can be used to construct the strike plate 100 according to an embodiment of the present invention which gives impact ramp 103 the ability to flex when coming in contact with a door latch mechanism 108. Guide ramp 104 and catch flap 102, in this example, act to slow the latch bolt. The ramp 105, in this example, connects with the slam barrier 101 which prevents the door 109 and door jamb 107 from making direct contact. Mounting screws 106 are used to attach the strike plate 100 to the door jamb 107 according to one embodiment of the present invention.

Figure 2:
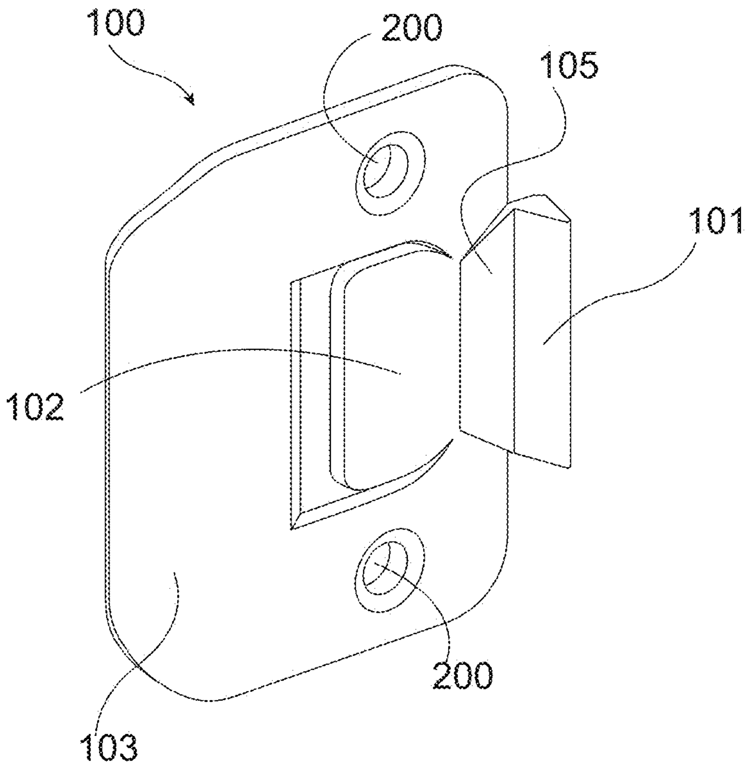
FIG. 2 is a perspective front view of the strike plate of FIG. 1 according to one embodiment of the present invention.

FIG. 2 is an perspective view of the strike plate 100 of FIG. 1 viewed from front/top. The strike plate has a front, rear surface, top edge bottom edge and a right and left edge when not installed in the door jamb according to an embodiment of the present invention. Those components previously introduced that have not changed in this example retain their original element numbers and are not reintroduced. Screw hole opening 200 is a recessed opening allowing the screw head to sit flush with the surface of the strike plate 100 in one embodiment of the present invention.

Figure 3:
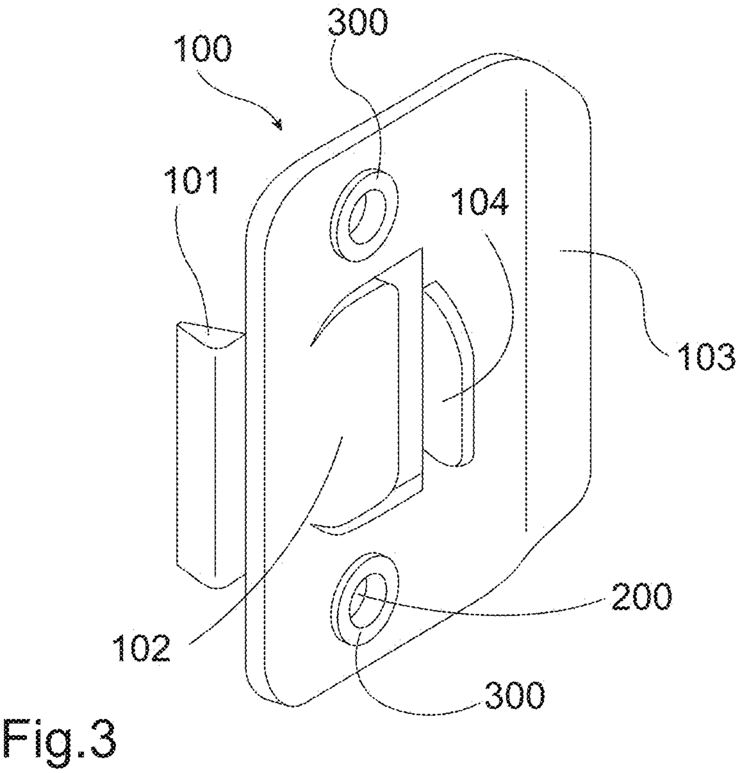
FIG. 3 is a perspective rear view of the strike plate of FIG. 1 according to one embodiment of the present invention.

FIG. 3 is an perspective view of the strike plate 100 of FIG. 2 viewed from bottom/top. The strike plate has a front, rear surface, top edge bottom edge and a right and left edge when not installed in the door jamb according to an embodiment of the present invention. Those components previously introduced that have not changed in this example retain their original element numbers and are not reintroduced. A raised rim 300 allows a screw hole opening 200 to keep from spreading when a screw is tightened through the strike plate 100 in one embodiment of the present invention.

Figure 4:
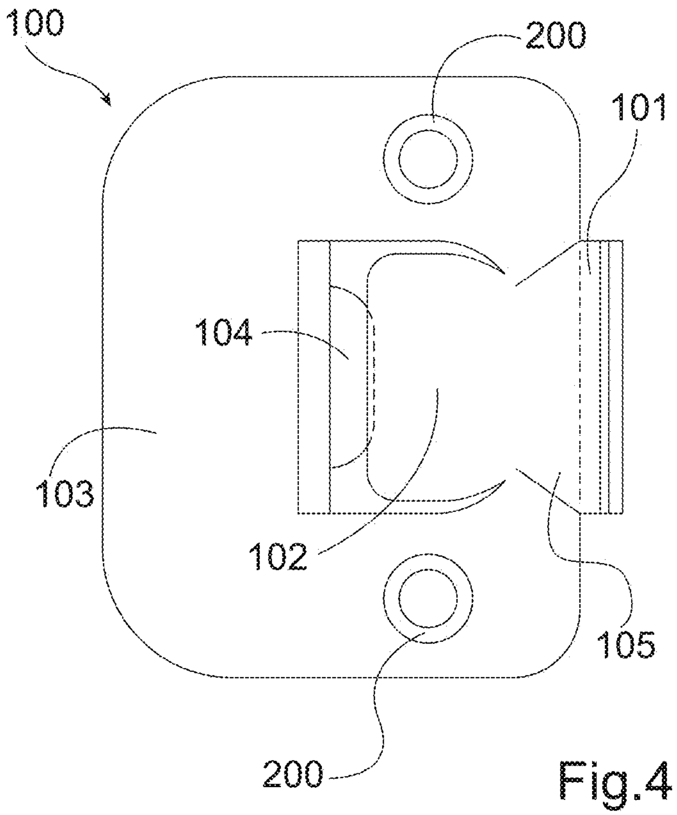
FIG. 4 is a front elevation view of the strike plate according to one embodiment of the present invention.

FIG. 4 is a front view of the strike plate 100 of FIG. 2. The strike plate has a front, rear surface, top edge bottom edge and a right and left edge when not installed in the door jamb according to an embodiment of the present invention. Those components previously introduced that have not changed in this example retain their original element numbers and are not reintroduced.

Figure 5:
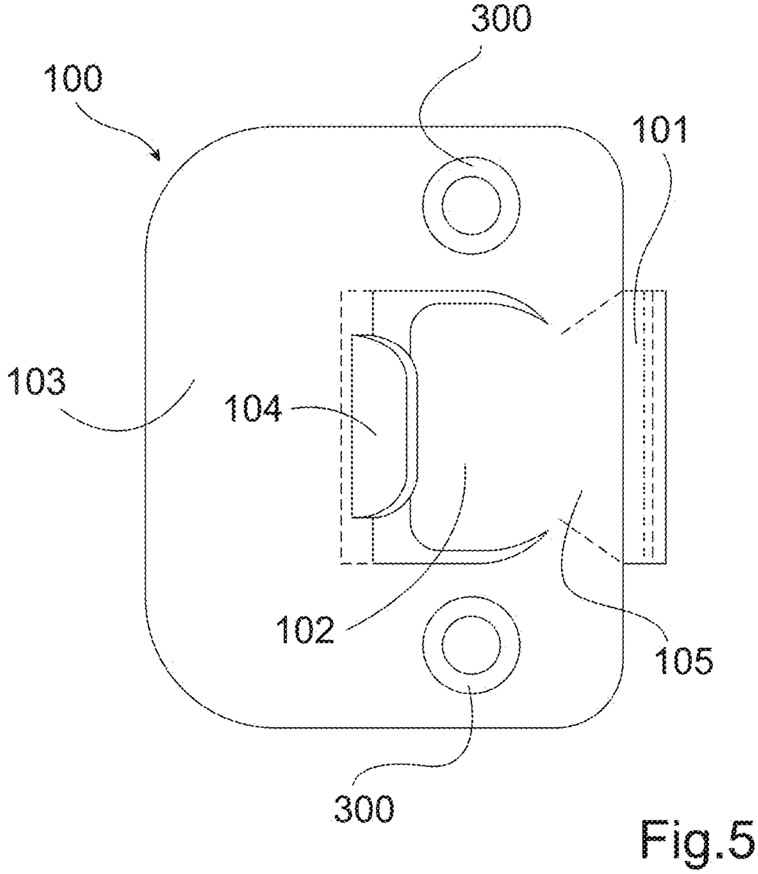
FIG. 5 is a rear elevation view of the strike plate of FIG. 4.

FIG. 5 is a rear view of the strike plate 100 of FIG. 2. The strike plate has a front, rear surface, top edge bottom edge and a right and left edge when not installed in the door jamb according to an embodiment of the present invention. Those components previously introduced that have not changed in this example retain their original element numbers and are not reintroduced.

Figure 6:
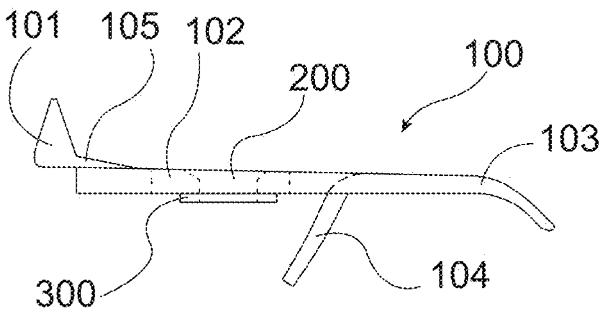
FIG. 6 is an elevation view of a top edge of the strike plate of FIG. 4.

FIG. 6 elevation view of a top edge the strike plate 100 of FIG. 2. The strike plate has a front, rear surface, top edge bottom edge and a right and left edge when not installed in the door jamb according to an embodiment of the present invention. Those components previously introduced that have not changed in this example retain their original element numbers and are not reintroduced.

Figure 7:
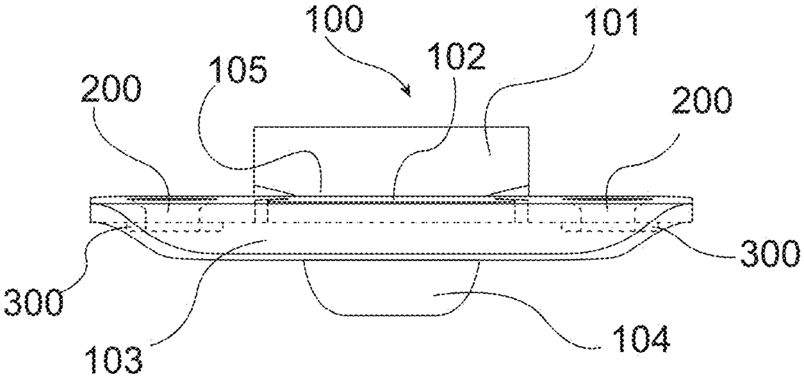
FIG. 7 is a left edge view of the strike plate of FIG. 4.

FIG. 7 is a left edge view of the strike plate 100 of FIG. 2. The strike plate has a front, rear surface, top edge bottom edge and a right and left edge when not installed in the door jamb according to an embodiment of the present invention. Those components previously introduced that have not changed in this example retain their original element numbers and are not reintroduced.

Figure 8:
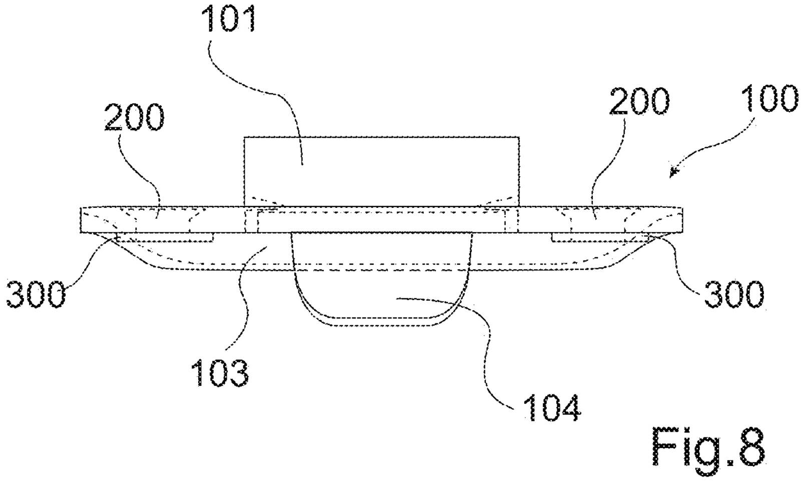
FIG. 8 is a right edge view of the strike plate of FIG. 4.

FIG. 8 is a right edge view of the strike plate 100 of FIG. 2. The strike plate has a front, rear surface, top edge bottom edge and a right and left edge when not installed in the door jamb according to an embodiment of the present invention. Those components previously introduced that have not changed in this example retain their original element numbers and are not reintroduced.

Figure 9A:
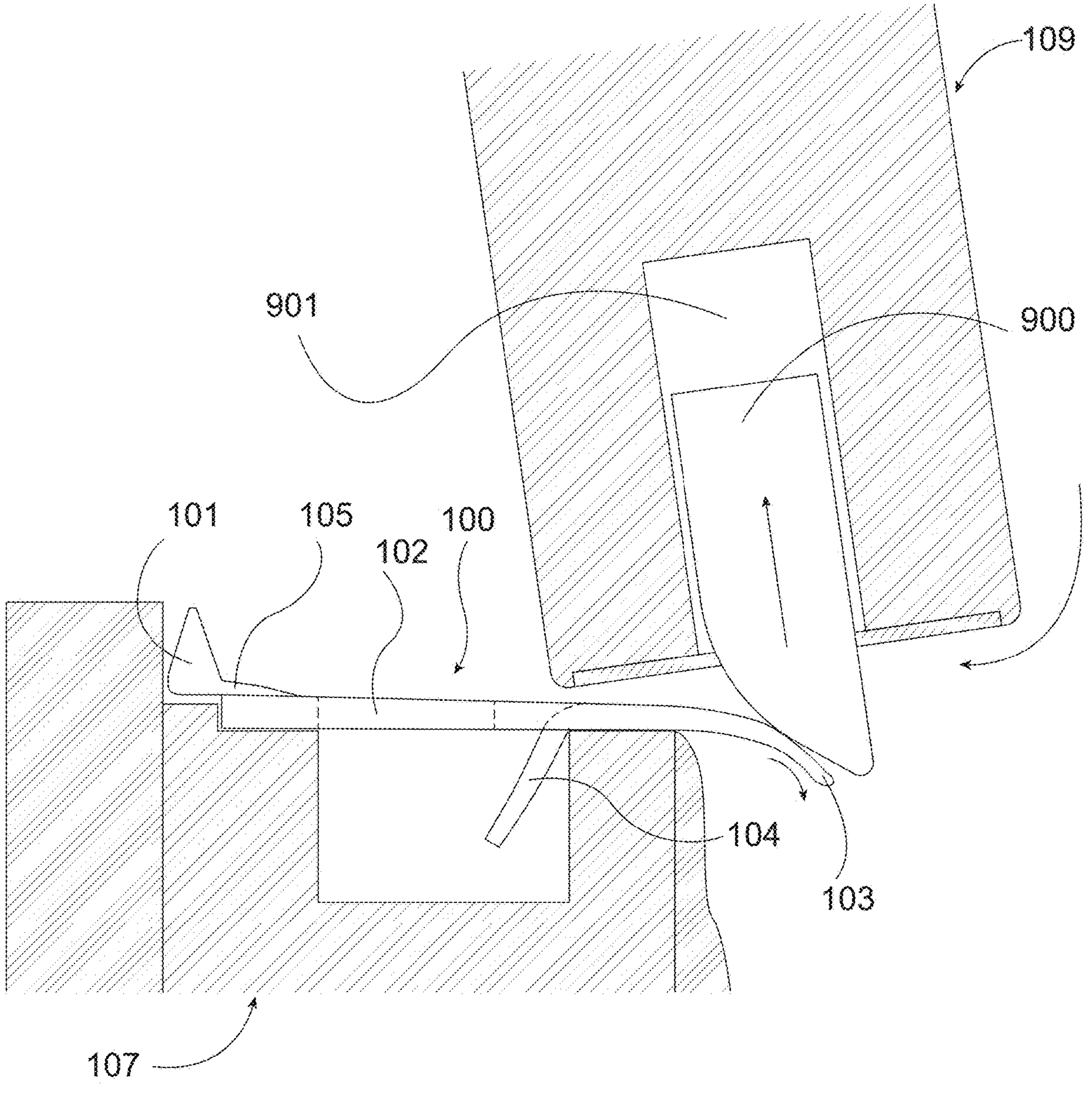
FIG. 9A is a section view of the strike plate, door and door jamb of FIG. 1 viewed along the section line A-A in FIG. 1 according to one embodiment of the present invention.

FIG. 9A is a section view of the strike plate 100 door 109 and door jamb 107 of FIG. 1 viewed along the section line A-A in FIG. 1 according to one embodiment of the present invention. In this example the door 109 is rotating towards the front of the strike plate 100, making initial contact with the impact ramp 103. This causes a latch bolt 900 to recess upwards into a recess inside the door 901 and the impact ramp 103 to deform and deaden the impact noise according to an embodiment of the present invention.

Figure 9B:
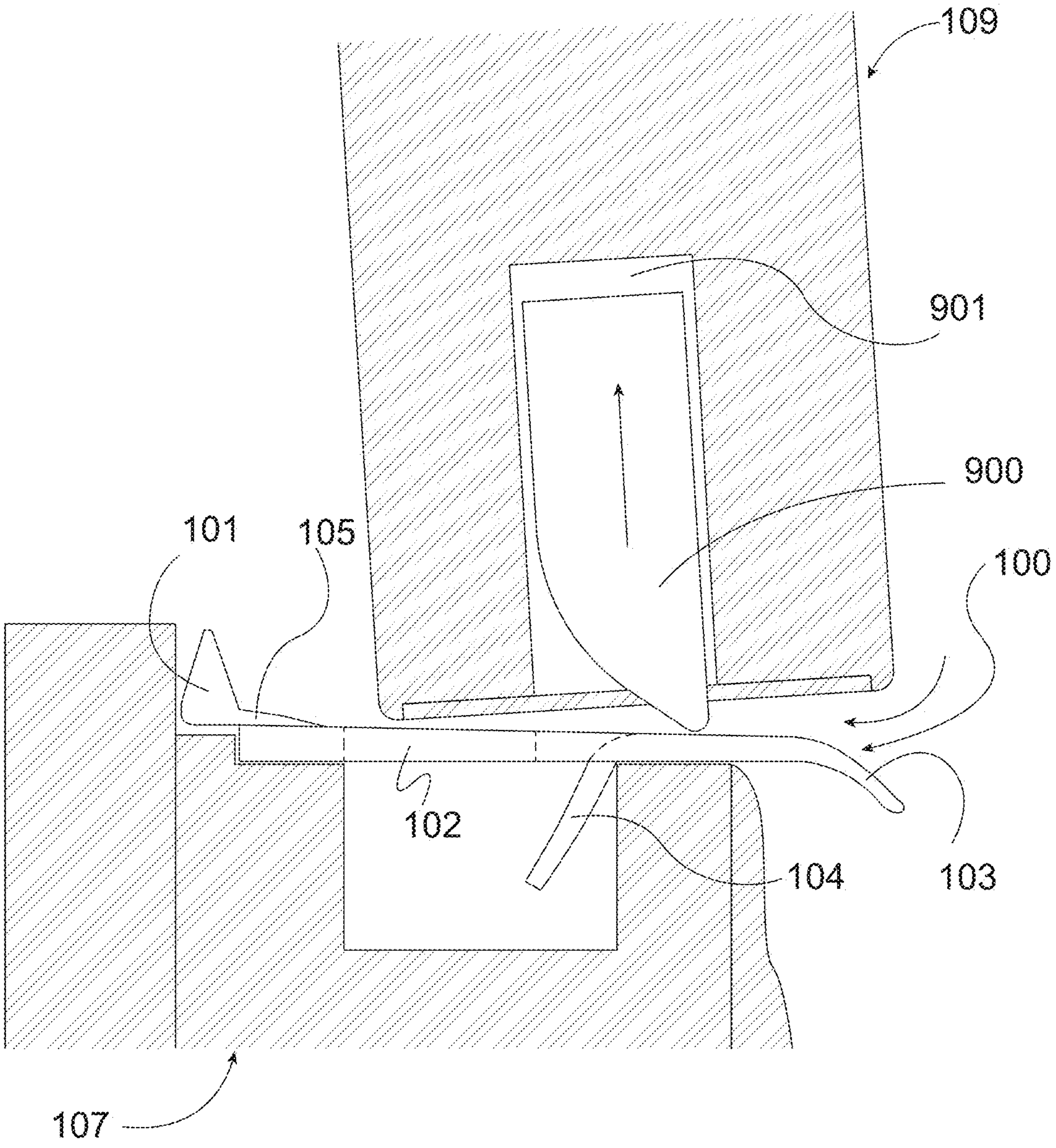
FIG. 9B is a section view of the strike plate of FIG. 1 viewed along the section line A-A in FIG. 1 depicting motion of a door, a latch bolt and a strike plate.

FIG. 9B is a continuation of motion of FIG. 9A. In this phase the door 109 has rotated further towards the door jamb 107. The latch bolt 900 has recessed further into the recess inside the door 901 and is gliding along the surface of the strike plate 100 according to an embodiment of the present invention.

Figure 9C:
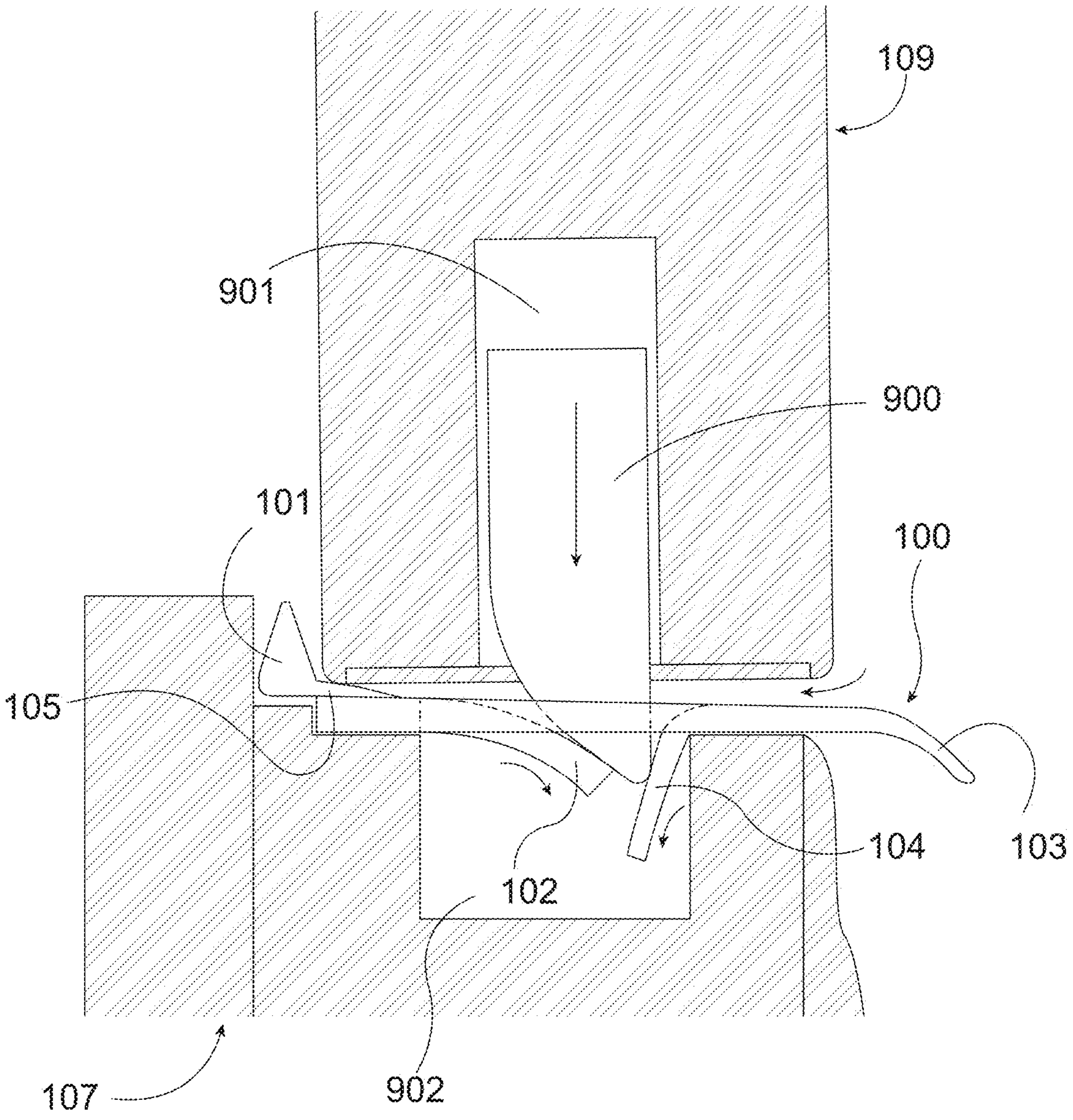
FIG. 9C is a section view of the strike plate of FIG. 1 viewed along the section line A-A in FIG. 1 depicting motion of a door, a latch bolt and a strike plate.

FIG. 9C is a continuation of motion of FIG. 9B. In this phase the door 109 is inline with the door jamb 107. The latch bolt is moving downwards toward a bolt opening 902 in the door jamb 107 according to an embodiment of the present invention. Guide ramp 104 and catch flap 102 are being spread open by the latch bolt as it lowers into the bolt opening 902. Guide ramp 104 and catch flap 102 slow the latch bolt and deaden the sound produced by pent up energy of the latch bolt being released according to an embodiment of the present invention.

Figure 9D:
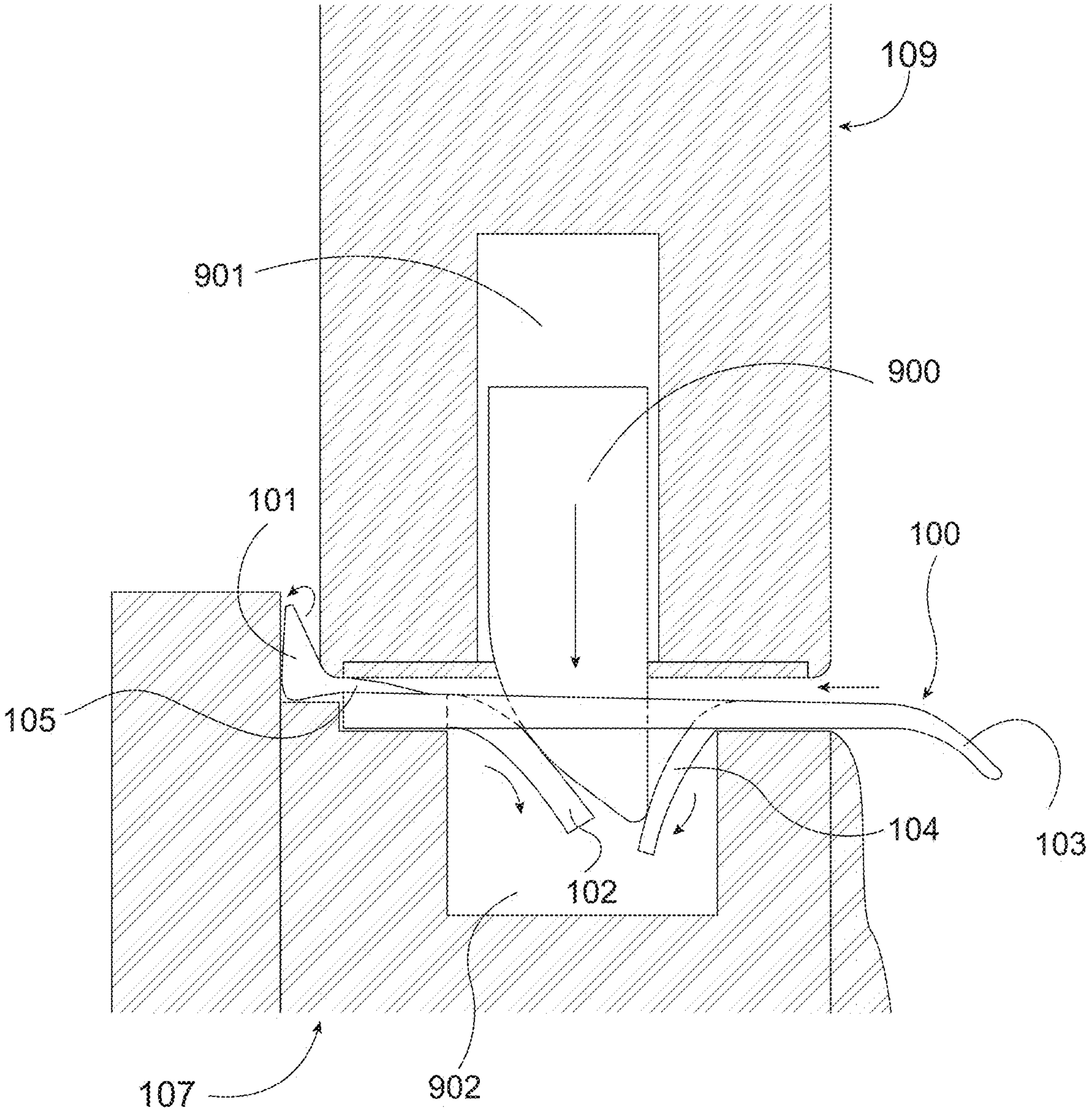
FIG. 9D is a section view of the strike plate of FIG. 1 viewed along the section line A-A in FIG. 1 depicting motion of a door, a latch bolt and a strike plate.

FIG. 9D is a continuation of motion of FIG. 9C. In this phase the door 109 rides up on the ramp 105 and hits against the slam barrier 101 which then folds back to slow the door 109 and acts as a cushion between door 109 and door jamb 107 to deaden the sound of a door 109 and door jamb 107 collision according to an embodiment of the present invention.

Figure 9E:
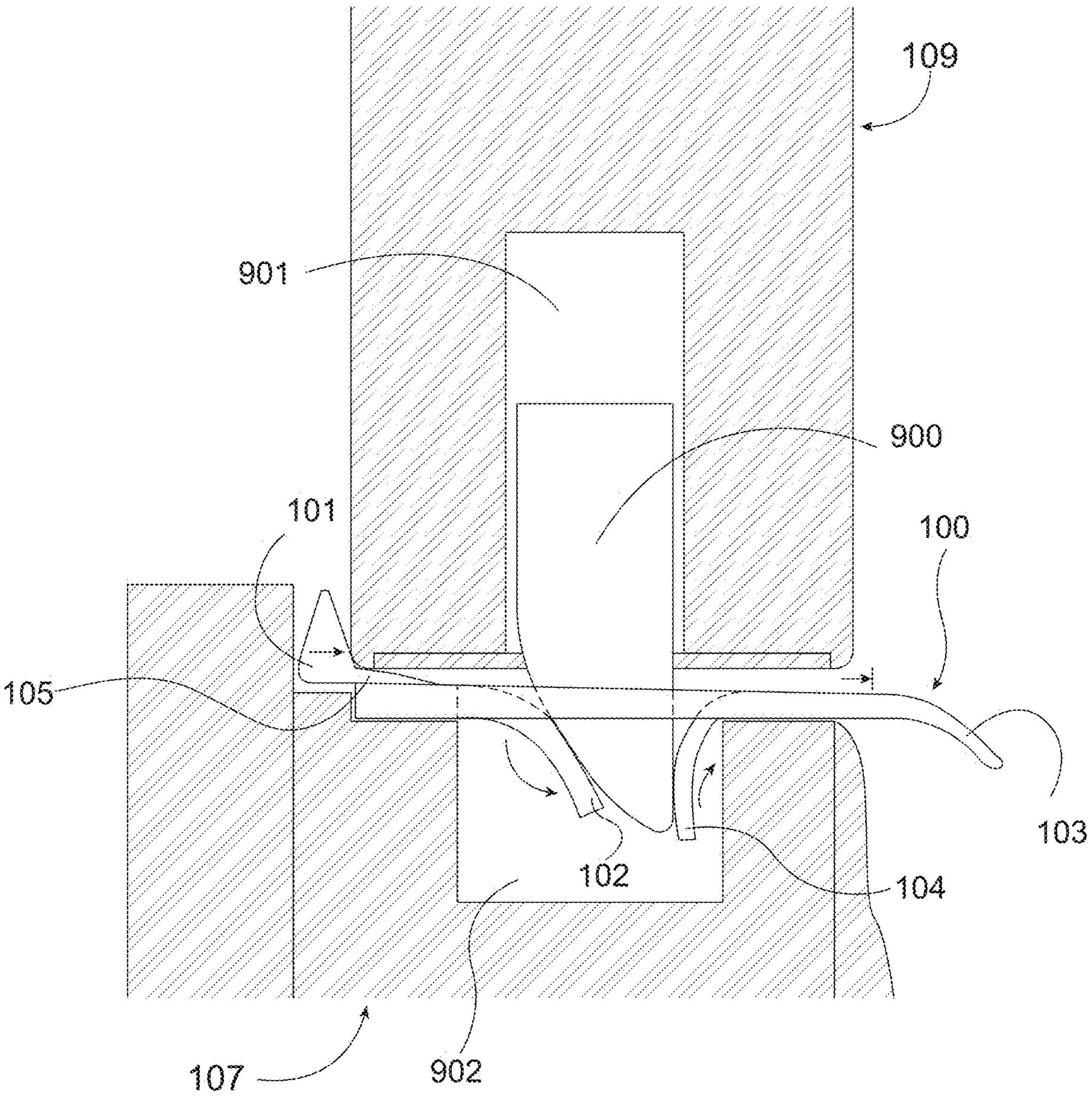
FIG. 9E is a section view of the strike plate of FIG. 1 viewed along the section line A-A in FIG. 1 depicting motion of a door, a latch bolt and a strike plate.

FIG. 9E is the finale of motion of FIG. 9D. In this phase the door 109 is in a resting latched state. The latch bolt is fully extended into the bolt opening 902. Guide ramp 104 and catch flap 102 are spread around the latch bolt and keep it from making contact with the edges of the bolt opening 902. The slam barrier 101 has returned back to its original shape according to an embodiment of the present invention.

Figure 10:
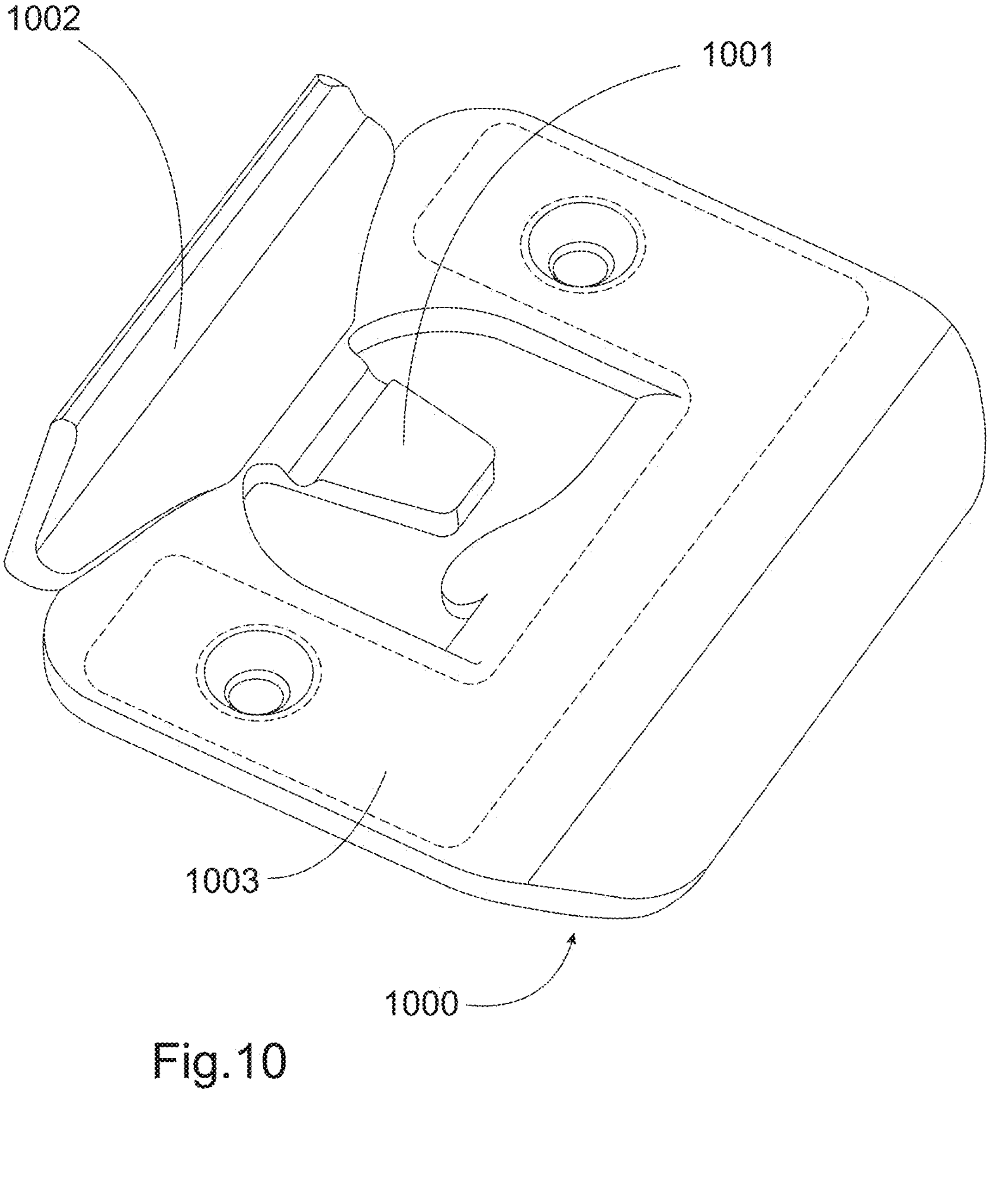
FIG. 10 is a perspective view of the strike plate according to a further embodiment of the present invention.

FIG. 10 is an perspective front/bottom view of a strike plate 1000. The strike plate has a front, rear surface, top edge bottom edge and a right and left edge when not installed in the door jamb according to an embodiment of the present invention. Strike plate 1000 is in this example shown with a slimmer and creased catch flap 1001. A wider and taller slam barrier 1002. A hard plastic or metal insert 1003 embedded in into the greater flexible strike plate 1000.

It will be apparent to one with skill in the art that the door latch strike plate and method of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A strike plate for reducing noise of a closing door comprising: a single-piece body formed entirely of a thermoplastic polyurethane (TPU) material, the body including a rectangular body portion having a pair of screw openings configured to fasten the strike plate to a door jamb in place of a standard metal strike plate; a rectangular opening; and one or more flaps around the rectangular opening, the one or more flaps being integrally molded with the body and configured to elastically deform into the rectangular opening to dampen noise during latch bolt engagement; wherein the one or more flaps comprise a catch flap and a guide ramp configured to slow descent of the latch bolt into the rectangular opening and absorb spring-loaded energy of the latch bolt.

2. The strike plate of claim 1, further comprising a slam barrier integrally molded with the body, the slam barrier projecting outward from the body and configured to flex upon door impact to cushion contact between the door and the door jamb.

3. The strike plate of claim 1, wherein the screw openings are recessed countersinks formed in the TPU body to receive screw heads flush with the surface of the strike plate.

4. The strike plate of claim 1, wherein the TPU body is dimensioned to retrofit into a standard residential door jamb opening in place of a conventional metal strike plate.

5. A method comprising the steps of: a) mounting a strike plate to a door jamb, the strike plate being the strike plate of claim 1; b) closing a door having a door-latching mechanism in alignment with the strike plate, causing further steps of: i) making contact between the latch bolt and the integrally molded flaps of the strike plate; and ii) the latch bolt, when aligned over the rectangular opening, forces the one or more flaps into the rectangular opening while the TPU body absorbs impact energy.

6. The method of claim 5, wherein the slam barrier deforms upon contact with the door to prevent direct collision between the door and the door jamb.

7. The method of claim 5, wherein the strike plate is formed of a resilient thermoplastic polyurethane (TPU) material that returns to its original shape after deformation.

8. The method of claim 5, wherein the strike plate includes a raised rim surrounding each screw opening to resist spreading of the TPU when a screw is tightened.

9. The method of claim 5, wherein the strike plate includes an internal cavity or channel within the TPU body that collapses under load to further dissipate acoustic energy.

* * * * *